United States Patent [19]
Vissers et al.

[11] 4,267,688
[45] May 19, 1981

[54] MOWING DEVICE

[75] Inventors: Hermanus H. Vissers; Gijsbert J. Mijnders, both of Nieuw-Vennep, Netherlands

[73] Assignee: Multinorm B.V., Nieuw-Vennep, Netherlands

[21] Appl. No.: 87,725

[22] Filed: Oct. 24, 1979

[30] Foreign Application Priority Data

Nov. 1, 1978 [NL] Netherlands .................. 7810873

[51] Int. Cl.³ .................................................. A01D 43/00
[52] U.S. Cl. ..................................... 56/16.4; 56/DIG. 1
[58] Field of Search ................ 56/DIG. 1, 16.4, 16.5, 56/16.6, 13.6

[56] References Cited

U.S. PATENT DOCUMENTS

| | | | |
|---|---|---|---|
| 3,084,493 | 4/1963 | Kucera | 56/24 |
| 4,055,037 | 10/1977 | Oosterling et al. | 56/DIG. 1 |
| 4,077,192 | 3/1978 | Klinner et al. | 56/DIG. 1 |

*Primary Examiner*—Robert A. Hafer
*Attorney, Agent, or Firm*—John P. Snyder

[57] ABSTRACT

In a mowing device comprising besides cutting members also a rotor having catches which crush the cut crop, the crushing effect is increased by providing ballast at the free ends of the catches along the arcs of a circle of the catches.

11 Claims, 4 Drawing Figures

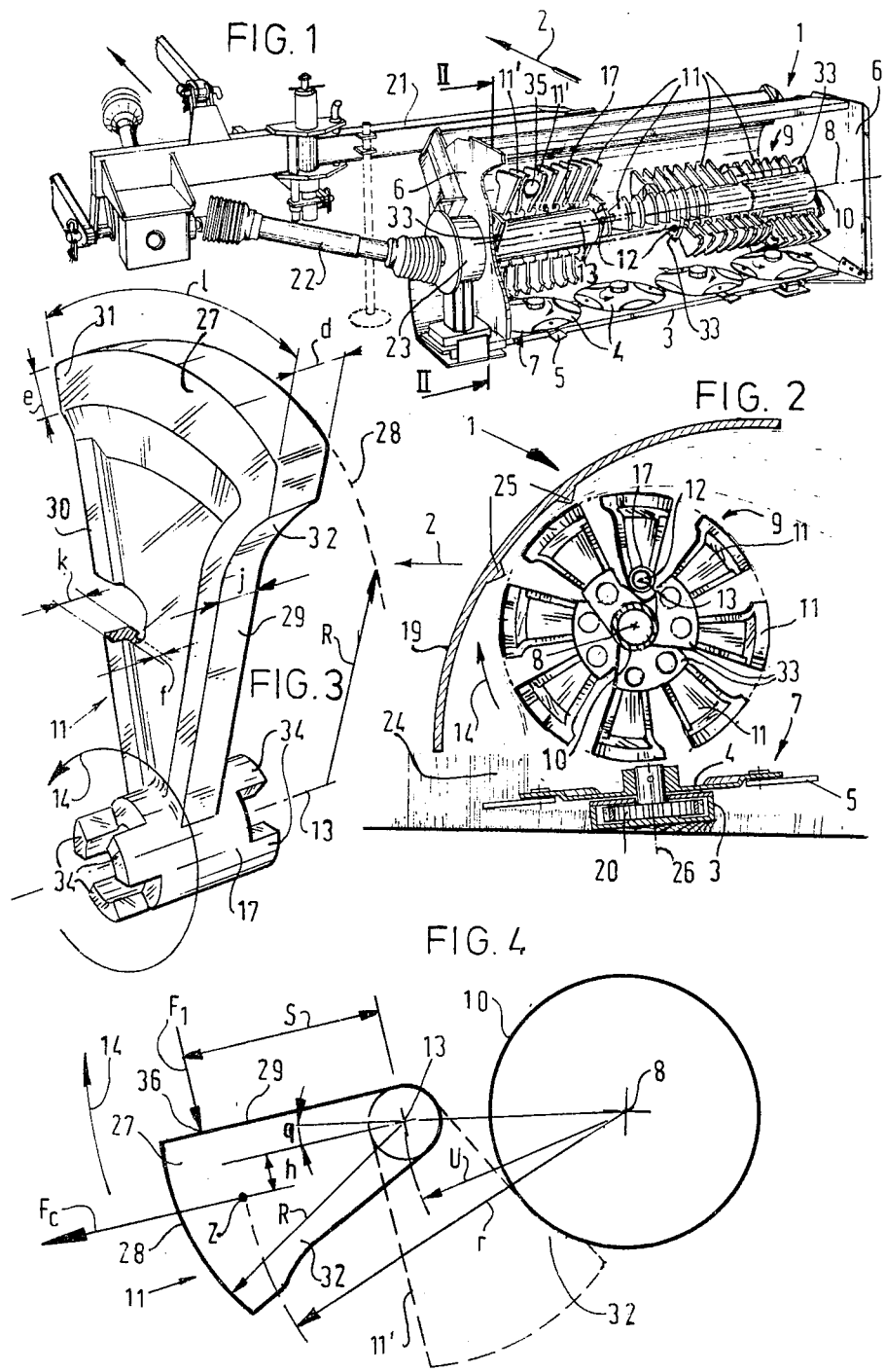

MOWING DEVICE

The invention relates to a mowing device comprising a frame, cutting members carried by said frame and adapted to move in a lying plane and at least one rotor journalled in the frame so as to be rotatable about a rotary axis for transporting cut crop, said rotor comprising at least one carrier and at least one crop-engaging catch connected with the carrier so as to be pivotable about a pivotal axis.

Such a mowing device is known from U.S. Pat. No. 4,055,037.

When the catch engages the crop, it is urged out of the radial plane going through the pivotal axis with respect to the carrier opposite the direction of rotation of the rotor by the resistance produced by the crop. Thus the diameter of the rotor is reduced, as a result of which the transport effect of the crop crushing operation of the rotor is diminished.

The invention has for its object to improve the crushing effect of the rotor. For this purpose the catch of the mowing device according to the invention is provided at its free end with ballast, which is arranged along the arc of a circle of the catch, so that the ballast occupies the most effective place.

A strong, comparatively light-weight, yet very effective catch is obtained, when it is substantially sector-shaped.

In this respect a more preferred catch comprises a hinge sleeve with a substantially sector-shaped disc having thickened rims.

In order to absorb the return strokes of the ballasted catch without damage of the same, the catch preferably has an arcuate stop part adapted to the periphery of the rotor carrier.

In order to avoid jamming of foreign objects such as stones between consecutive catches, the catch is preferably adapted to bend out of its plane.

A cheap catch is obtained, when it is a monolith to which a hinge sleeve is formed by casting.

In order to avoid the need for dismounting a whole sequence of catches covering the length of the rotor in the event of a defective catch, the rotor preferably has at its ends as well as between these ends hinge pin supports, whilst between every two hinge pin supports pivotal shafts are arranged, the length of which is shorter than that of the rotor and a plurality of pivotal shafts carrying each a group of catches is distributed along the circumference of the rotor.

In order to have the possibility of simultaneously utilizing the inertia forces of the ballasts of a plurality of catches, the catches are groupwise coupled with one another by means of interengaging coupling elements arranged at the ends of the hinge sleeves.

The invention will be described more fully hereinafter with reference to a drawing showing a preferred embodiment of a mowing device according to the invention.

The drawing shows in

FIG. 1 a perspective rear view of said mowing device,

FIG. 2 an enlarged sectional view taken on the line II—II in FIG. 1,

FIG. 3 an enlarged, perspective elevational view of a catch, and

FIG. 4 an enlarged, schematic elevational view of a catch in its operational position with respect to the carrier.

The mowing device 1 according to the invention comprises a frame 6, an elongated housing 3 of a gear wheel drive 20 extending transversely of the direction of movement 2 of the mower 1, the ends of said housing being fastened to the frame 6, four cutting members 7 rotatably journalled on the housing 3, disposed above said housing 3 and adapted to rotate about standing axes 26, each member comprising a cutter holder 4 and cutters 5 secured thereto, and a rotor 9 journalled in the frame 6 so as to be rotatable about a lying rotary axis 8 for transporting cut crop 24.

The rotor 9 comprises a carrier 10 and eight groups of catches 11 engaging the cut crop 24. For each group of catches 11 the carrier 10 has a pivotal shaft 12 extending in the direction of length, on which the catches 11 are connected with the carrier 10 so as to be pivotable about a lying pivotal axis 13. Each catch 11 is substantially sector-shaped and comprises a hinge sleeve 17 slipped onto a pivotal shaft 12.

According to the invention each catch 11 is provided at its free end with ballast 27 arranged between an outer arc of a circle 28. The catch 11 is made in the form of a monolith from a wear-resistant synthetic resin, for example, polyamide, whilst a hinge sleeve 17 is formed thereon, for example, by spray-casting. The catch 11 mainly comprises a sector-shaped disc with thickened rims, the hindmost, radially extending rim 29, viewed in the direction of rotation 14 of the rotor 9, being broader than the front rim 30. The foremost outer tip 31 of the catch 11, viewed in the direction of rotation 14, is broader than the radial front rim 30. The catch 11 described is elastically deformable out of its plane as far as into the position 11' indicated by broken lines in FIG. 1 so that a foreign object 35, for example, a stone getting in between two neighbouring catches 11 can escape from between them. The rear rim 29 has an arcuate stop part 32 matching the round periphery of the shaft-shaped carrier 10 of the rotor 9.

At its ends as well as between the same the rotor 9 has ear-shaped, radial pivot pin supports 33 welded to the carrier 10, pivotal shafts 12 being arranged between every two consecutive pivot pin supports 33, the length of said shafts being shorter than that of the rotor 9. The pivotal shafts 12 are evenly distributed along the circumference of the rotor and carry each a group of catches 11, which are intercoupled by means of interengaging, arcuate coupling elements 34 formed at the ends of the hinge sleeves 17 so that the catches can pivot groupwise with respect to the pivotal shaft 12 and the total ballast of said catches 11 is available for treating the crop. The rotor 9 is surrounded by a hood 19 fastened to the frame 6.

The high centrifugal force obtained for an important part from the ballast 27 retains the catches 11 in their desired outermost operative position. The ballast 27 additionally arranged in extremely outermost position results in that the working position of the catches 11 and the diameter of the rotor 9 are better maintained.

The mowing device 1 can be suspended to an agricultural tractor by means of a suspension frame 21. Through a universal shaft 22 and a bevel pinion drive 23 the rotor 9 and the gear wheel drive 20 are driven.

The crop is cut by the cutting members 7 and the cut crop 24 is engaged by the catches 11 of the rotor 9, transported along the hood 19, crushed at strips 25 fastened to the hood 19 and deposited on the field behind the mower 1, where it will dry rapidly owing to the crushing effect. Only at a given value of overload, which depends upon the inertia force of the ballast 27 of the catch 11, on the place of said ballast with respect to the pivotal shaft 12 of the rotor 9 and on the speed of the rotor 9, the position of the catch 11 with respect to the rotor 9 changes. By the choice of said magnitudes the situation in which the positions of the catches 11 vary can be determined in advance.

A particularly effective conditioning of the crop 24 is obtained by a comparatively light-weight rotor 9 at a high speed of the rotor 9 of 1000 rev/min, a radius u of the pivotal shafts 12 of 105 mms, and a total mass of each catch 11 of 125 gs. For each catch 11:

the radius R of the arc 28=13 cms,
the arc length l of the arc 28=9 cms,
the arc thickness d=15 mms,
the arc width e=16 mms,
the disc thickness f=6 mms,
the rim thickness k of the front rim 30=1 cm,
the rim thickness j of the rear rim 29=16 mms, and the shape of the catch 11 is preferably as illustrated in the drawing, whilst the catch may be made from the aforesaid material.

The catches 11 operate like strikers, which have a heavy impact force at a speed n of 1000 rev/min of the rotor 9. The catch 11 swung back through an angle g (FIG. 4) has a centre of gravity Z and a radius r of 17 cms, so that the centrifugal force $$F_c = m \cdot w^2 \cdot r = 0.125(2\pi \cdot 1000)^2/60 = 233N.$$

The crop exerts a force on the catch 11 of $F_1$. The torque produced by said force $F_1$ is counteracted by the centrifugal force $F_c$ with an arm h·$F_c$·h=$F_1$·S, wherein S is the distance between the mean point of engagement 36 of the crop 24 on the catch 11 and the pivotal axis 13. The shape of the striker is chosen so that at an angular turn g the striking surface of the catch 11 will not assume an excessively trailing position. The shape is furthermore chosen so that when striking a hard object the catch 11 can strike back against the round carrier 10. At the level of the centre of gravity Z the inertia force of the catch 11 is absorbed so that a great deceleration will not produce a bending moment in the catch 11. The dimensions are chosen so that the catch 11 can turn away in the shadow of the rugged carrier 10.

What we claim is:

1. A mowing device comprising a frame, cutting means carried by said frame for cutting a crop close to the ground, at least one rotor journalled in the frame so as to be rotatable about a rotary axis disposed above the cutting means, said rotor comprising at least one carrier and at least one crop-engaging catch connected with the carrier so as to be freely pivotable at one end about a pivotal axis radially displaced from said rotary axis, and means for rotating said rotor whereby said catch tends to align its center of gravity along a line containing said rotary and pivotal axes, said catch having an arcuate marginal edge portion remote from said one end thereof and lying in a plane perpendicular to said pivotal axis, a substantial portion of the mass of said catch being concentrated along said marginal edge portion.

2. A mowing device as claimed in claim 1, characterized in that the catch is substantially sector-shaped.

3. A mowing device as claimed in claim 1 or 2, characterized in that the catch consists of a hinge sleeve with a substantially sector-shaped disc having thickened rims.

4. A mowing device as claimed in claim 3, characterized in that the hindmost, radially extending edge of said catch, viewed in the direction of rotation of the rotor, is broader than its front edge.

5. A mowing device as claimed in claim 4, characterized in that the foremost tip of the catch, viewed in the direction of rotation of the rotor, is broader than the radial front edge of the catch.

6. A mowing device as claimed in claim 1, characterized in that the catch has an arcuate stop part adapted to the periphery of the rotor carrier.

7. A mowing device as claimed in claim 1 characterized in that the catch is made from wear-resistant synthetic resin.

8. A mowing device as claimed in claim 3 characterized in that the catch is a monolith to which a hinge sleeve is formed by casting.

9. A mowing device as claimed in claim 1 characterized in that at the ends as well as between the ends the rotor has hinge pin supports, in that pivotal shafts are arranged between every two hinge pin supports, said shafts having a shorter length than the rotor and in that a plurality of pivotal shafts carrying each a group of catches is distributed along the circumference of the rotor.

10. A mowing device as claimed in claim 9, characterized in that the catches are groupwise coupled with one another.

11. A mowing device as claimed in claim 10, characterized in that the catches of a group are coupled with one another by means of interengaging coupling elements arranged at the ends of the hinge sleeves.

* * * * *